United States Patent [19]

Wagner

[11] 4,270,408
[45] Jun. 2, 1981

[54] GEAR DRIVE FOR GAS TURBINE ENGINE

[75] Inventor: Douglas A. Wagner, Indianapolis, Ind.

[73] Assignee: General Motors Corporation, Detroit, Mich.

[21] Appl. No.: 951,751

[22] Filed: Oct. 13, 1978

[51] Int. Cl.$^3$ .................... F16H 37/06; F16H 35/08; F16H 57/00
[52] U.S. Cl. ........................ 74/661; 74/402; 74/410; 74/665 L; 74/655 M
[58] Field of Search ............... 74/661, 665 L, 665 M, 74/665 N, 410, 402; 244/60

[56] References Cited

U.S. PATENT DOCUMENTS

| 1,089,029 | 3/1914 | Zimmerman | 74/661 X |
|---|---|---|---|
| 1,351,470 | 8/1920 | Davis | 74/410 |
| 1,475,982 | 12/1923 | Buhr | 74/410 |
| 1,738,695 | 12/1929 | Dennison | 74/410 |
| 1,747,334 | 2/1930 | Sundstedt | 74/661 X |
| 1,759,689 | 5/1930 | Day | 74/410 |
| 2,248,792 | 7/1941 | Taylor | 74/410 |
| 2,315,409 | 3/1943 | Fedden et al. | 74/410 |
| 2,462,824 | 2/1949 | Zimmerman | 244/60 |
| 2,865,219 | 12/1958 | Allen | 74/410 |
| 2,935,884 | 5/1960 | Sharpe | 74/410 X |
| 3,323,388 | 6/1967 | Snoy et al. | 74/410 X |
| 3,400,602 | 9/1968 | Scardaci | 74/410 |
| 3,997,042 | 12/1976 | Langham | 192/46 |

FOREIGN PATENT DOCUMENTS

| 23717 | of 1909 | United Kingdom | 244/60 |
|---|---|---|---|
| 8598 | of 1914 | United Kingdom | 244/60 |
| 116149 | 5/1918 | United Kingdom | 74/665 L |
| 814905 | 6/1959 | United Kingdom | 74/410 |
| 999944 | 7/1965 | United Kingdom | 74/410 |

*Primary Examiner*—Leslie Braun
*Attorney, Agent, or Firm*—J. C. Evans

[57] ABSTRACT

A drive system for a multiple gas turbine engine system includes power output shafts from first and second gas turbine engines, each power shaft connected to drive a load and each engine including a load sharing cross-over shaft for power transfer from one of the engines to the other engine;

a right angle gear box assembly connects each of the power output shafts to the cross-over shaft and each of the right angle gear box assemblies includes first and second load sharing gear paths including tooth geometry in an input bevel gear configured to produce a thrust reversal so that for normal direction torque transfer the input bevel gear thrust is in a direction to load mesh points in both gear paths and for a reversal of torque direction from input to output gears the input gear thrust is reversed so that the input gear will be directed into a tighter mesh to take out normal backlash in the system so that reverse meshed torque paths will be maintained in each of the first and second gear paths to maintain a sharing of torque in both forward and reverse directions of drive within the gear box assembly thereby to reduce weight and size of gear components of aircraft or other lightweight drive systems with reverse driving modes.

2 Claims, 6 Drawing Figures

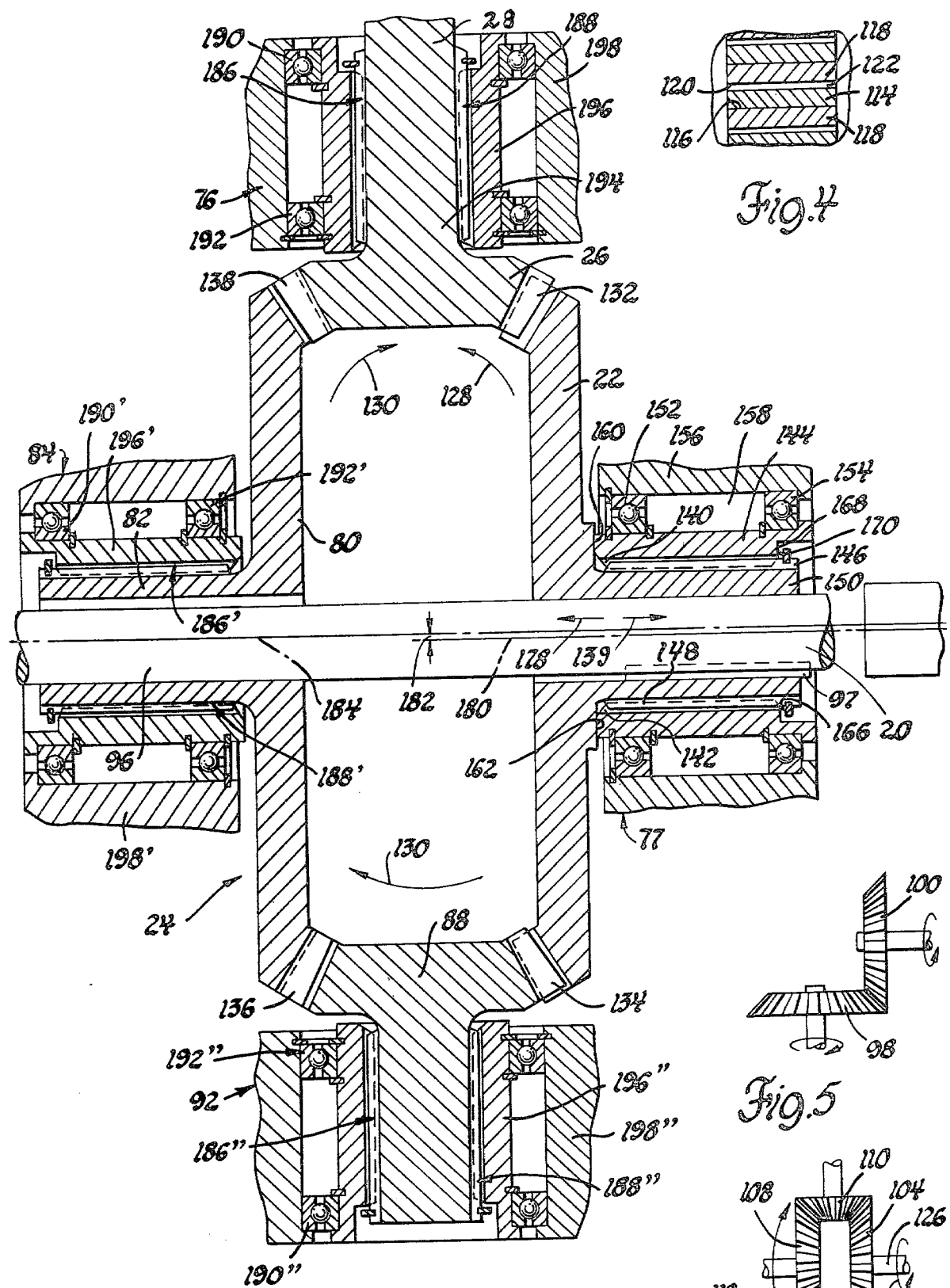

GEAR DRIVE FOR GAS TURBINE ENGINE

Various proposals have been suggested for multiple gas turbine engine systems for aircraft use. A representative system includes a pair of lift cruise gas turbine engines having associated fans which are adjustable for use in both vertical and conventional flight operating modes. Each lift cruise engine has a forwardly located fan and includes hub air supercharging of a core engine as well as bypass air flow around the core engine. Gas exiting from the core engine turbine flows through a conventionally mounted power turbine to drive a forward shaft to a reduction gear to the lift cruise fan of the engine. A right angle bevel gear set is provided between the power turbine shaft and the lift cruise fan to provide for power extraction or power input. Each engine associated with a lift cruise fan can drive a fan of an opposite engine when the power turbine of the opposite engine is decoupled from the system by an overrunning clutch assembly.

It has been recognized that a normal two gear right angle bevel gear box can be developed to transfer torque in reverse directions therethrough. To accommodate torque transmission in each direction through such a right angle box, one approach has been to design each gear in the two gear box to accommodate swings in torque imposed upon the gear teeth of the two gears.

Another approach to increased capacity in gear components in a right angle gear set is set forth in U.S. Pat. No. 2,248,792, issued July 8, 1941 to Taylor. The right angle gear drive set forth in the Taylor patent provides split load paths, but has no provision for accommodating changes in torsional load produced by reversal of torque upon the gear components of the drive system.

U.S. Pat. No. 2,315,409, issued Mar. 30, 1943 to Fedden et al discloses a beveled gear drive for transmitting power from an engine at right angles to an air screw shaft. It includes a boxed configured set of beveled gears for splitting a load from an engine to a drive propeller shaft. However, it has no provisions to insure load sharing upon reversal of torque from the propeller shaft back to the engine. There is no suggestion of modification of the beveled gear components for use in multiple engine applications where power or torque is transferred to a cross-over shaft from one engine to the fan of a second engine when it is decoupled from the fan by an overrunning clutch assembly.

Another arrangement that recognizes that load sharing can be produced by the provision of a first pair of drive and driven pinions coupled together by use of a pair of idler gears is set forth in U.S. Pat. No. 1,738,695, issued Dec. 10, 1929 to Dennison. In the Dennison arrangement a power transmission gearing has an input bevel gear and an output bevel gear coupled together by idler gears for use in transmitting power through a right angle. In particular, the gear box is used for driving deep well pumps of the rotary type. In the illustrated arrangement, a load equalizing frame is supported by heads of a stationary cylindrical casing and is adapted for limited rotary movement about the axis of a driven shaft with end discs thereon acting as bearings for the load equalization frame. If a slight excess of power is delivered to one or the other of beveled gears in the right angle gear box, the frame is adjusted slightly to alter its position about the axis of the shaft until there is equalization of power delivery from an input shaft to an output shaft. There is no provision for adjustment of gear load paths to accommodate for reversal of power flow through the gear box.

It is also recognized that a plurality of beveled gears can be coupled together in a box either including a rectangular or square configuration of multiple bevel gears for use as a high speed ratchet adaptor to reach nuts and bolts that are inaccessible by a straight through wrench or ratchet arrangement. Such a configuration is set forth in the U.S. Pat. No. 3,400,602 issued Sept. 10, 1968 to Scardaci. However, the box and rectangularly configured beveled gears have no provision in association therewith to accommodate for reversal of torque in an aircraft engine drive type system and to assure maintenance of mesh engagement during drive reversal where forward drive backlash clearance is included to accommodate aircraft drive system gear considerations.

Accordingly, an object of the present invention is to improve a right angle gear box having a right angle, box configured set of bevel gears therein by means associated with the gears and responsive to thrust reversal produced by a preselected gear geometry on the teeth of an input bevel gear to maintain a high torque capacity, load splitting and load sharing during reversal of drive between an input and an output one of the bevel gears in the right gear box assembly.

Still another object of the present invention is to provide an improved gear drive for use in the drive system for multiple gas turbine engines having a crossover drive between first and second engines and wherein a right angle gear box is provided between each of the engines and the cross-over shaft with a set of bevel gears located in the box to transmit torque in one direction from the engine to the cross-over shaft and to produce a reverse drive through the gear box from first engine to a second engine; the meshed gear teeth of the set of bevel gears having a tooth configuration and arrangement that will produce a thrust reversal that will maintain the teeth of the gears in meshed contact for load sharing and load splitting with a resultant high torque capacity within the right angle gear box upon reverse drive and reversal of torque in both directions between an input and an output bevel gear of the right angle gear box.

Still another object of the present invention is to provide an improved drive system for use in multiple gas turbine engine applications having first and second gas turbine engines each with an output power shaft connected to drive a fan and including a load sharing cross-over shaft between each of the engine output shafts to maintain power transfer to each of the loads when one of the engines is disconnected from the system by an overrunning clutch and wherein a right angle gear box assembly is connected between each of the engine output power shafts and the cross-over shaft and includes a box configured set of bevel gears including an input and an output bevel gear and a pair of idler gears and wherein the input pinion from the engine to the gear box has its center line offset from the center line of the gear box and gear teeth having a tooth geometry to maintain a first and second meshed load carrying path between the input and output bevel gears during transfer of power from the input gear to the output gear in response to normal engine operation and wherein means including the offset input gear respond to torque reversal and a resultant reversed thrust on the input gear to cause it to shift inboard of the gear box assembly to compensate forward drive backlash and assure reverse drive mesh in both the first and second load carrying paths to produce load splitting in both forward and reverse drive whereby reduced weight components can be utilized in the gear box assembly to accommodate transfer power from each of the engines to their respective output shafts during normal engine operation while permitting a reverse flow of power from one of the engines to the fan of the other when the other is disconnected from the system.

Another object of the present invention is to provide an improved gear box assembly for accommodating reversals in torque and input drive between first and second bevel gears within a gear box assembly coupled together by means of a pair of idler gears and wherein the bevel gears and idler gears are configured to have a tooth geometry that maintains a defined amount of backlash in a direction perpendicular to adjacent gear tooth surfaces at mesh points in the gear box thereby to accommodate manufacturing tolerances of the gears and to accommodate operating temperature ranges for given housing and shaft materials that are utilized in association with the gears as well as to accommodate tooth deflections of the gears under load operating conditions including adjustment means to position and move an input gear that under normal direction of power flow transmits half its power through mesh with an output gear while the other half of the power passes through the input gear thence through two idler gears to the output gear and wherein the adjustment means positions the input gear upon drive reversal from the output gear to the input gear of the box to cause takeup of the combined backlashes of multiple mesh points in the load path from the output gear through the two idler gears back to the input gear so that load splitting and sharing occurs both during drive from the input gear to the output gear as well as from the output gear to the input gear.

Further objects and advantages of the present invention will be apparent from the following description, reference being had to the accompanying drawings wherein a preferred embodiment of the present invention is clearly shown.

FIG. 3 is a diagrammatic view of the component parts and bearing support arrangement of the gear box assembly in FIG. 2;

FIG. 4 is a partially developed view showing the backlash between teeth on bevel gears in the box of FIG. 3 during a forward drive mode of operation, and FIGS. 5 and 6 are diagrammatic views of right angle gear boxes improved by use of the present invention.

Figure 1:
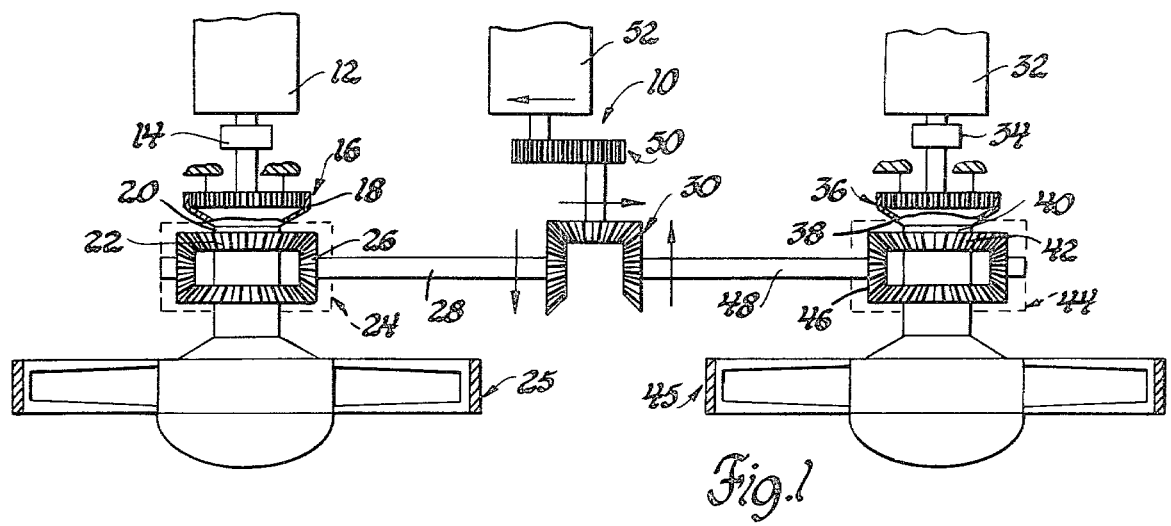
FIG. 1 is a diagrammatic view of a multi-engine configuration including the torque reversal and drive gear box assembly of the present invention.

FIG. 1 shows a multi-engine drive system 10 which includes a first engine 12 having an output shaft connected through an overrunning clutch 14 to the sun gear input of a planetary reduction gear unit 16 having a ring gear output 18 thereof connected to a drive shaft 20 that is coupled to the input bevel gear of a gear box assembly 24 which is connected to a diagrammatically illustrated fan 25 and through an output pinion 26 to cross-over shaft 28 and combiner gear box 30. The system 10 further includes a second engine 32 having an output shaft therefrom connected through an overrunning clutch 34 to the sun gear input of a planetary reduction gear set 36 which has the ring gear output 38 thereof secured to a fan drive shaft 40 that directs power to the input gear 42 of a second gear box assembly 44 connected to a fan 45 and corresponding to the gear box assembly 24. An output pinion 46 therefrom is connected to a second cross-over shaft 48 coupled to the combiner gear box 30. In the illustrated arrangement a power take off 50 is connected from the combiner gear box 30 to power accessory units 52.

Figure 2:
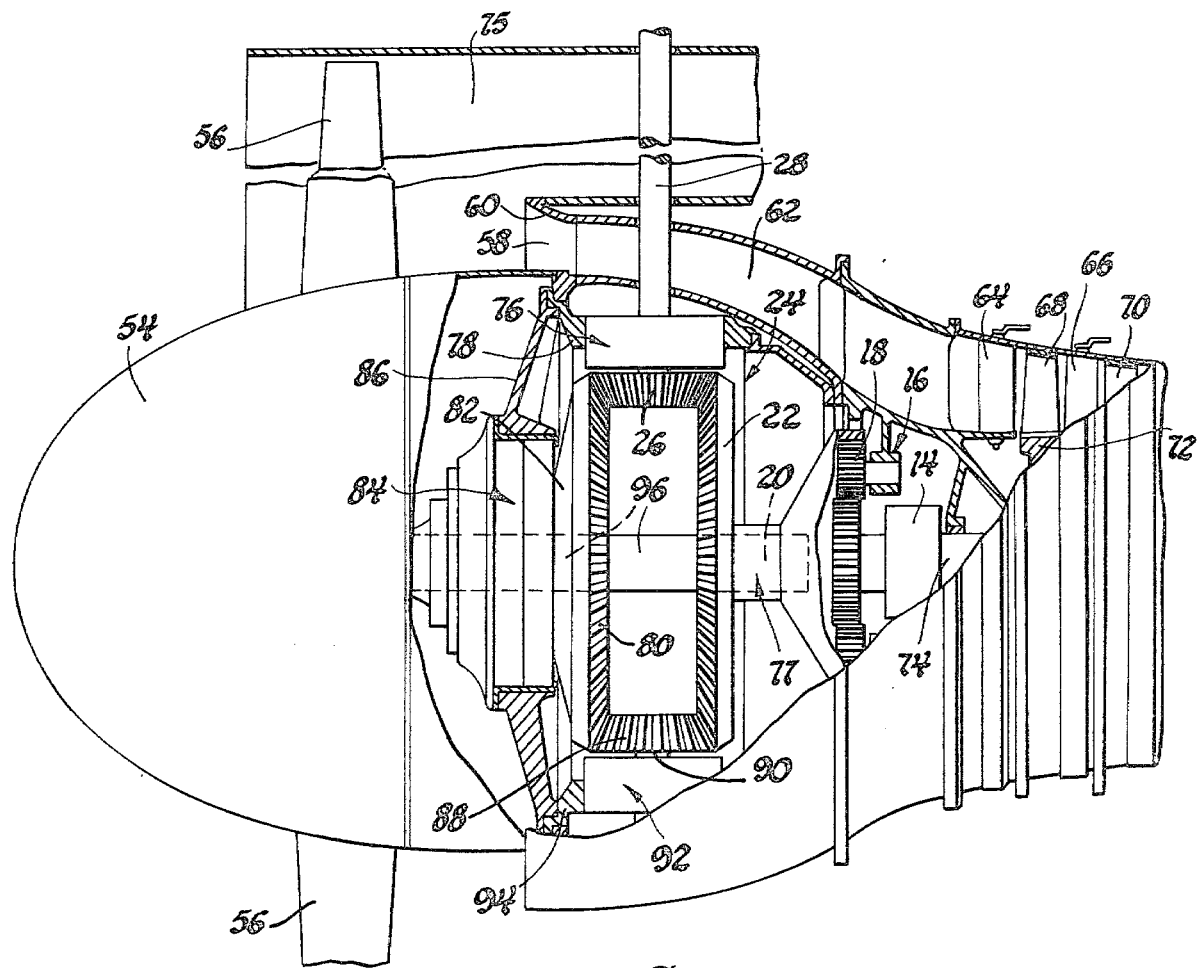
FIG. 2 is a fragmentary, side elevational view, partially broken away and sectioned of a lift cruise engine including the gear box of the present invention.

Referring now more particularly to FIG. 2, the first and second engines 12, 32 are shown as being lift cruise engines having a fan hub 54 that connects to radial blades 56 in either the fan 25 or the fan 45. The fan blades 56 are at the front of each engine 12, 32 and hub air is directed across a plurality of radially located guide vanes 58 is an annular inlet 60 leading to an air supply passage 62 that communicates with a plurality of variably controlled compressor stator rings 64, 66 and an associated row of compressor blades 68, 70 that are supported on a compressor rotor 72. The compressor rotor 72 is connected by means of a shaft 74, a portion of which is shown in FIG. 2, to the output shaft of a turbine component of a gas turbine engine 12 for supplying compressed air to a combustor assembly where air and fuel are burned to produce motive fluid for driving the turbine. The fan air from the hub 54 is utilized to supercharge the compressor of the core engine and bypass air flows through an annular shroud passage 75 partially illustrated in FIG. 2. In the illustrated arrangement, components of the engine including combustor, fuel supply and details of the power turbine components thereof are omitted for clarification of the description of the present invention. Gas exiting from the core engine turbine of the illustrated arrangement flows through a conventionally aft mounted power turbine which drives forward through a reduction gear such as a diagrammatically illustrated gear set 16 to drive the hub 54 and the fan blades 56. In the illustrated arrangement, the gear box assembly 24 of the present invention is illustrated enclosed within the nacelle of the engine for transferring power from the illustrated drive shaft 20 to the cross-over shaft 28 a portion of which is illustrated in FIG. 2.

The gear box assembly 24 has the input bevel gear 22 supported in bearing assembly 77. The output bevel pinion 26 thereof is supported by a bearing assembly 76 that is carried by a fixed bearing support strut 78. Assembly 24 also includes an opposed idler bevel gear 80 that has a hub 82 thereon supported by a bearing assembly 84 by means of a fixed engine support strut 86 within the nacelle of the engine located forwardly of the gear box assembly 24 therein. A second smaller diameter idler bevel pinion 88 of the gear box assembly 24 has a hub 90 thereon supported by a bearing assembly 92 that is supported by a fixed engine strut 94 within the nacelle.

During normal engine operation, torque is transmitted from the power turbine to the input bevel gear 22 of the gear box assembly 24 thence to the cross-over shaft 28 where the torque is balanced by that from the crossover shaft 48 connected from the second engine 32. Power transfer to the blades 56 of the fans 25, 45 is through drive shaft extensions 96 through bores in the aligned hubs of the input bevel gear 22 and idler bevel gear 80. Shaft 20 is connected to gear 22 by a key 97.

The input bevel gear 22 and the right angular oriented output bevel gear pinion 26 constitute component parts of the gear box assembly 24 which have a torque reversal and opposite drive therethrough in accordance with engine operation.

More particularly, when either one of the engines 12, 32 is cut-off, power transfer to the lift fan drive system is automatically decoupled by means of either of the overrunning clutches 14, 34. Each of the clutches 14, 34 is helical spline configuration clutch of the type set forth in U.S. Pat. No. 3,997,042, issued Dec. 14, 1976 to Langham for Aircraft Engine Coupling. It includes a nonratcheting feature to avoid tooth damage during disengaged operation thereof.

When an engine associated with a given one of the lift fan blades is inoperative, the fan is driven through the one of the gear box assemblies 24, 44 with engine power. Such power supplied from the opposite engine causes a torque and drive reversal through the gear box of the cut-off engine. By virtue of the present invention, such torque and drive reversal is accomplished without requiring excessive weight or size in the gear components of the gear box assembly.

To better understand the invention, reference to a typical right angle bevel gear drive is shown in FIG. 5. In the FIG. 5 arrangement, an input bevel gear 98 is associated with an output bevel gear 100 through a right angle turn. Such a right angle gear box can transfer torque in either direction. However, the greater the torque desired the larger the gear components must be. The increased size of the bevel gears 98, 100 and their tooth design are established by design limits such as pitch line velocity, tooth stresses and scoring that can occur in the tooth surfaces of the beveled gears. Accordingly, to use such a normal or conventional right angle gear box in aircraft applications having the reverse drive requirements requires that the components be of substantial cross-section with resultant increased weight and size, especially since there are no load split or load sharing capabilities.

A known arrangement for increasing the torque capacity of a right angle gear box is shown in FIG. 6. The technique of increasing torque capacity of the right angle box of FIG. 6 utilizes an input bevel gear pinion 102 and a right angularly located output bevel gear 104 that meshes with the input gear 102 to transfer torque through a first power flow path with one mesh point indicated by the arrow 106 in FIG. 6. Additionally the gear box of FIG. 6 includes an idler bevel gear 108 meshing with the input gear 102 and also with a second idler bevel gear 110 that meshes with the output gear 104 to define a second torque transfer path 112 with three mesh points which transfer an amount of torque equal to that through the path 106 between the input bevel gear pinion 102 and output bevel gear 104. The gear mesh of such bevel gear arrangement includes a tooth geometry which will accomplish the equal distribution of power through the torque paths 106, 112 in a forward direction of drive from gear 102 to gear 104. In such arrangements, however, as shown in FIG. 4, there is a predetermined amount of backlash that is provided between teeth of the meshed gears 102, 104 and 102, 108; 108, 110; and 110, 104. Such backlash is shown in the fragmentary developed view of FIG. 4 where bevel tooth 114 of a drive gear is in contact with a face 116 of a bevel gear tooth 118 on a driven gear. In such arrangements, the drive tooth 114 is spaced from an opposite face 120 of a driven gear tooth 118 through a backlash space 122 during torque transfer from an input shaft 124 to an output shaft 126 in the gear box of FIG. 6. The illustrated backlash is required for a number of reasons, including accommodation of manufacturing tolerances of the gears where there can be tooth to tooth spacing errors, lead errors, and the like on individual gears. Moreover, it accommodates gear to gear manufacturing tolerance differences required to insure interchangeability of gears in a power transfer system. Another reason for such backlash is to accommodate for operating temperature differences which cause differential expansion between the housing of the gears and shaft materials. For example, in aircraft engine applications aluminum or magnesium is used for the bearing housings and steel shafts and bearings are used for the power transfer train. In such cases cold starts can be made under temperatures less than minus 40° F. and sometimes down to minus 65° F. In such arrangements the housings can contract more than the shaft and drive components of the power transfer and thus move gears closer together toward the apex of the beveled gear pinions, hence causing teeth to mesh more deeply, a movement which is allowed by the backlash space. The backlash space in turn is reduced as the teeth mesh more deeply between adjacent gear components. In the past, in gear boxes like that shown in FIG. 6, static dimensional tolerances were compensated by shimming of the bearing assemblies that supported the gear components with respect to the housing to set minimum acceptable backlash dimensions. Maximum allowed backlash spacing is selected to prevent a shift of the contact pattern between adjacent ones of the bevel gears off of the tooth surfaces that are meshed together. In gear boxes such as shown in FIG. 6, the maximum backlash that is required, as shown by the space 122, is such that when power is transferred in a reverse direction through the gear box, more particularly from the output shaft 126 to the input shaft 124, the teeth on the bevel gear 104 will adjust to mesh with the teeth on the bevel gear teeth of the pinion 102 to permit reverse torque or power transfer through the path 106. At the same time, however, because of the normal clearances that exist in the bearing supports for the idler gears 108, 110 and the backlash space therebetween, the second torque loop does not carry an equal amount of power in a reverse direction through the path 112. In other words, the right angle box array of bevel gears shown in FIG. 6 has only one-half the torque capacity for reverse torque therethrough as compared to direct input transfer from the input shaft 124 to the output shaft 126.

In accordance with the present invention, the gear box assemblies 24, 44 are configured to make use of the known thrust reversal of spiral bevel gears to result in a gear box design which has a high torque capacity upon forward and reverse torque direction between an input and an output shaft of a right angle gear box. More particularly, spiral beveled gear geometry within the box 24 as shown in FIG. 3 is selected so that torque transfer between the input bevel gear 22 to the output bevel gear pinion 26 through a torque path 128 will equal the torque transfer through a second torque path 130 from the input bevel gear 22 thence through the idler gear pinion 88, the bevel idler gear 80 and the output bevel gear pinion 26. During such torque transfer, power transmission is distributed half through the path 128 through one mesh of teeth shown at 132 in FIG. 3 and through a second path made-up of three mesh points of bevel gear teeth shown at 134, 136 and 138 in the diagrammatically shown gear box of FIG. 3. In such arrangements, if the output gear pinion 26 is held stationary to simulate the resistance of a driven unit, the input pinion 22 will rotate a slight degree through the backlash of the one mesh point 132 to begin loading the gear set. Continued rotation to take-up the combined backlashes of the three mesh paths 134, 136, 138 is necessary to load the second torque transfer path 130. In the present arrangement, such drive only occurs by adjustment of the input bevel gear 22 axially because of a selection of a spiral angle, pinion gear ratio and pressure angle of the mesh points between the input pinion 22 and the output pinion 26 to produce an outward axial thrust 139 on the pinion 22 to aid in the adjustment of backlash within the two torque paths 128 to 130. The outward thrust 139 is produced by selecting a spiral angle, pinion gear ratio and pressure angle at the mesh point 132 in accordance with the design procedures set forth in Design Chart No. 6 Axial Thrust, at pages 36, 37 of Gleason Bevel and Hypoid Gear Design Book, Gleason Works, Rochester, N.Y. 1956. In such an arrangement, when the gear teeth on the bevel gear 22 and the output bevel gear pinion 26 at the mesh point 132 have a spiral angle of 35 degrees, a pressure angle of 20 degrees and a gear ratio of 1:1 an outward thrust shown by the arrow 139 acts on the input bevel gear 22 to shift it axially outward. Axial movement is guided by a pair of spline teeth 140, 142 on an axially fixed bearing housing 144 which are slidably engaged with a pair of spline teeth 146, 148 secured to the hub 150 of the gear 22. A pair of ball bearings 152, 154 rotatably support housing 144 and hub 150 for rotation within an outer fixed bearing housing 156. More particularly, bearings 152, 154 are suitably axially fixed within a space 158 between inner housing 144 and outer housing 156. The housing 144 includes a thrust stop surface 160 engageable with a locator ring 162 on hub 150 to limit outboard movement produced by thrust 139. When the hub 150 is in an outboard adjusted position, a snap ring thereon defines an inboard surface 166 which is spaced from a stop surface 168 on the housing 144 to define a clearance space 170 for inboard adjustment of the input bevel gear 22 during thrust reversal. When the spiral bevel gear geometry is selected as set forth above and the torque path is in the direction of the arrow 128, the bevel gear 22 will be in engagement with the thrust stop surface 160 and will mesh at the mesh point 132 with the output bevel gear pinion 26. Such drive from input gear 22 to output pinion 26 will produce mesh points at 134, 136, 138 so as to cause equal distribution of torque in paths 128, 130, henceforth referred to as a forward direction of torque flow through the gear box assembly 24. A like forward flow of power through the gear box 44 will cause a torque balance at the combiner gear box 30 as long as both of the engines 12, 32 remain operative.

Assuming now that the engine 12 is disconnected from the system, the clutch 14 will be disabled to decouple the engine 12 from the fan 25 and there will be a power transfer from the cross-over shaft 48, the combiner gear box 30 and the cross-over shaft 28 to the bevel gear pinion 26. The gear 24 becomes a left-hand driven member moving in a clockwise direction and in accordance with the aforesaid Gleason Chart No. 6, the axial thrust in percentage of the tangential load between the gears (assuming a spiral angle of 35 degrees, gear ratio of 1:1 and a pressure angle of 20 degrees) will produce a negative or inward thrust shown by the arrow 178 in FIG. 3 to produce a reversal of axial thrust on bevel gear 22 that will move the gear 22 inwardly of the gear box until the inboard surface 166 of the snap ring on hub 150 engages the stop surface 168. The clearance 170 is exaggerated for purposes of illustrating the invention, it being understood that small shifts in axial position are capable of compensating for backlash which would otherwise prevent reverse transfer through a torque path 130 as was discussed with reference to old style bevel gear boxes of the type set forth in FIG. 6. In the illustrated arrangement, because of a provision for shifting the input gear 22 inboard of the box because of the axial thrust force represented by the arrow 178 at FIG. 3, the gear 22 will cause the gears to move closer together (toward the apex of one another) and hence the teeth at the mesh points 132, 134, 136, 134 are more deeply engaged to reduce the backlash at mesh points 134, 136, 138 which would otherwise prevent a reverse power transfer through the torque flow path 130. To further accommodate backlash at mesh points 134, 136, 138 upon torque reversal, the center line 180 of the hub 150 of gear 22 is offset by a dimension 182 from the center line 184 of the gear 80 and the drive shaft 96 so that the teeth on gear 22 will be moved into a tighter mesh with teeth on pinion 88 at the mesh point 134. This tighter mesh is carried into the bevel gears 88, 80 at mesh point 136 and the gears 80, 26 at mesh point 138 by provision of adjustable components within the bearing supports 92, 84 and 76 of the improved gear box 24.

Each of the bearing assemblies 76, 84, 92 are configured to allow for a slight axial adjustment of the associated gear hubs upon application of the inward thrust represented by the arrow 178. More particularly and with reference to the bearing assembly 76, this is accomplished by the provision of first and second pairs of axially slidably engaged splined teeth guides 186, 188 and ball bearing assemblies 190, 192 formed so that when a side thrust is placed on the bevel gear pinion 26 the hub 194 of pinion 26 will be free to move axially with respect to an inner bearing housing 196 rotatably supported with respect to an outer bearing housing 198 so as to effect a torque transfer mesh at the mesh point 138. The clearance 170 at the input bevel gear 22 is selected to change the backlash throughout the gear mesh points 134, 136, 138 an exact amount to maintain a desired load sharing in the torque paths 128, 130 upon reversal of drive therethrough wherein the bevel gear pinion 26 becomes the input driving gear and the bevel gear 22 becomes the output driven gear. The details of the axially adjusting bearing sets 84, 92 correspond to the component parts of the bearing assembly 76 described above. In the case of the bearing assembly 84 the component parts which correspond identically to those in the bearing assembly 76 are marked with the same reference numerals primed and in the case of the bearing assembly 92 like corresponding parts carry the same reference numerals double primed.

Thus the aforesaid arrangement of gears take advantage of thrust reversal actions that occur in a gear when it is switched from a drive to a driven state to take-up the combined backlashes in a three mesh path which would otherwise be maintained open to prevent an equal distribution of torque in a reverse direction through a bevel gear box having an input and an output gear as well as a pair of idler gears. The offset dimension 182 mentioned above in effect can make the total backlash through the idler torque loop 130 less than the backlash at the input output gears (torque loop 128) to permit the axial translation of one of the input gears to cause load sharing both in the forward and a reverse direction of drive through the gear box.

While the embodiments of the present invention, as herein disclosed, constitute a preferred form, it is to be understood that other forms might be adopted.

The embodiments of the invention in which an exclusive property or privilege is claimed are defined as follows:

1. In a multiple engine drive system having first and second engines with an output shaft connected to drive a load and including a load sharing cross-over drive between each of the engine output shafts to maintain power transfer to each of the loads when one of the engines is disconnected from the system, the improvement comprising:

a right angle gear box assembly connecting each of the output shafts to the cross-over drive, each gear box assembly having an input gear connected to one of the output shafts and an output gear connected to the cross-over drive, bearing means to support said input and output gears for limited axial movement, said input gear and said output gear defining a first torque loop and having meshed gear teeth thereon with a tooth geometry to produce an outboard thrust on said input gear during normal drive between the input and output gears, means for limiting outboard axial movement of said input gear in response to the output thrust imposed thereon during power transfer from the engine to the gear box assembly and the cross-over drive, idler gears in said gear box each having gear teeth thereon in meshed engagement with said gear teeth on said input and output gears respectively to define a second torque loop to split torque transfer from each of the output shafts to each cross-over drive during transfer of torque from the input gear to the output gear in response to normal engine operation, each of said right angle gear box assemblies having a reverse torque imposed thereon when the engine connected thereto is disconnected from the system wherein power is transferred from a cross-over drive to an output gear to drive it in a reverse direction and to impose a reverse torque and drive on the input gear, said input and output gear teeth geometry including means responsive to the reversal of torque through said right angle gear box assembly to produce a reverse thrust on the input gear to shift it inboard of the gear box assembly to maintain a continued drive mesh between the input, output and idler gears to maintain a reverse load carrying gear path from the output gear to the input gear and a reverse load carrying path from the output gear through the idler gears thence to the input gear whereby load sharing is maintained in both directions of torque transfer through the gear box assembly thereby to enable use of reduced weight component parts in the gear box assembly to transfer power from each of the engines to their respective output shafts during both normal engine operation and disconnected engine operation wherein power is tranferred to both of the engine loads from one of the engines.

2. A multiple gas turbine engine drive system having first and second core engines with a power turbine output shaft connected to drive a fan and including a load sharing cross-over drive between each of the engine output shafts to maintain power transfer to each of the fans when one of the engines is disconnected from the system, an overrunning clutch assembly which responds to a negative torque produced by a freewheeling fan, a right angle gear box assembly connecting each of the output shafts to the cross-over drive, each gear box assembly having an input gear connected to one of the power turbine output shafts and to the fan and further having an output gear connected to the cross-over drive, bearing means to support said input and output gears for limited axial movement, said input gear and said output gear defining a first torque loop and having meshed gear teeth thereon with a tooth geometry to produce an outboard thrust on said input gear during normal drive between the input and output gears, means for limiting outboard axial movement of said input gear in response to the output thrust imposed thereon during power transfer from the engine to the gear box assembly, the fan and the cross-over drive, idler gears in said gear box each having gear teeth thereon in meshed engagement with said gear teeth on said input and output gears respectively, to define a second torque loop to split torque transfer from each of the output shafts to each cross-over drive during transfer of torque from the input gear to the output gear in response to normal engine operation, each of said right angle gear box assemblies having a reverse torque imposed thereon when the engine connected thereto is disconnected from the system wherein power is transferred from a cross-over drive to an output gear to drive it in a reverse direction and to impose a reverse torque and drive on the input gear, said input and output gear teeth geometry including means responsive to the reversal of torque through said gear box assembly to produce a reverse thrust on the input gear to shift it inboard of the gear box assembly to maintain a continued drive mesh between the input, output and idler gears to maintain a reverse load carrying gear path from the output gear to the input gear and a reverse load carrying path from the output gear through the idler gears thence to the input gear whereby load sharing is maintained in both directions of torque transfer through the gear box assembly thereby to enable use of reduced weight component parts in the gear box assembly to transfer power from each of the engines to their respective output shafts and fans during both normal engine operation and disconnected engine operation wherein power is transferred to both of the engine loads from one of the engines.

* * * * *